(12) United States Patent
Narayan et al.

(10) Patent No.: US 11,943,682 B2
(45) Date of Patent: Mar. 26, 2024

(54) MOBILE DEVICE, SYSTEM AND METHOD (71) Applicant: SIGNIFY HOLDING B.V., Eindhoven (NL)

(72) Inventors: Govind Narayan, Eindhoven (NL); Marco Haverlag, Mierlo (NL); Sonia Kataria, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 206 days.

(21) Appl. No.: 17/436,748

(22) PCT Filed: Mar. 9, 2020

(86) PCT No.: PCT/EP2020/056187
§ 371 (c)(1),
(2) Date: Sep. 7, 2021

(87) PCT Pub. No.: WO2020/182719
PCT Pub. Date: Sep. 17, 2020

(65) Prior Publication Data
US 2022/0182788 A1    Jun. 9, 2022

(30) Foreign Application Priority Data
Mar. 12, 2019   (EP) .................................... 19162279

(51) Int. Cl.
*H04W 4/029*   (2018.01)
*H04B 17/318*   (2015.01)

(52) U.S. Cl.
CPC .......... *H04W 4/029* (2018.02); *H04B 17/318* (2015.01)

(58) Field of Classification Search
None
See application file for complete search history.

(56) References Cited

U.S. PATENT DOCUMENTS

| 8,254,858 B2 | 8/2012 | Tu et al. |
| 8,675,535 B2 | 3/2014 | Finlow-Bates et al. |
| 2003/0085819 A1* | 5/2003 | Gustavsson .......... G08G 1/0962 340/988 |
| 2013/0196595 A1 | 8/2013 | Byrne et al. |
| 2017/0156027 A1* | 6/2017 | Peng .................... H04B 17/318 |
| 2017/0286889 A1 | 10/2017 | Yu et al. |
| 2018/0027633 A1* | 1/2018 | Roquemore, III .... H04W 76/10 370/254 |

FOREIGN PATENT DOCUMENTS

KR    101741406 B1    5/2017

* cited by examiner

*Primary Examiner* — Adolf Dsouza (57) ABSTRACT

The present disclosure provides a mobile device comprising: a motion sensor configured to determine a motion of the mobile device; a radiofrequency transceiver configured to receive an advertisement of at least one node; a controller configured to receive the motion of the mobile device; a user interface. The controller is configured to (i) obtain and parse the advertisement of the at least one node, when the mobile device is in a first motion, and (ii) display a list comprising the parsed advertisement of the at least one node on the user interface, when the mobile device is in a second motion. The first motion is the mobile device moving along a path and the second motion is the mobile device not moving away from a location on the path.

12 Claims, 3 Drawing Sheets

MOBILE DEVICE, SYSTEM AND METHOD

CROSS-REFERENCE TO PRIOR APPLICATIONS

This application is the U.S. National Phase application under 35 U.S.C. § 371 of International Application No. PCT/EP2020/056187, filed on Mar. 9, 2020, which claims the benefit of European Patent Application No. 19162279.4, filed on Mar. 12, 2019. These applications are hereby incorporated by reference herein.

FIELD OF THE INVENTION

The invention relates to a mobile device, more specifically a mobile device suitable for displaying a list comprising a parsed advertisement of at least one node on a user interface. The invention further relates to a system comprising the mobile device according to the invention and said at least one node. The invention further relates to a method of displaying a list suitable for commissioning at least one node with said mobile device; and to a computer program product.

BACKGROUND OF THE INVENTION

There is an ongoing trend in the professional lighting market to move towards connected lighting systems which enable all kinds of new features such as e.g. (remote) scheduling, energy monitoring, sensor-based lighting control and asset management. These connected systems are often installed in existing buildings, in which a wireless network is preferred to avoid drawing new cables (for lighting control) through walls and/or the ceiling. Wireless network protocols commonly used within such a wireless network may for example be: Zigbee, Thread, BLE mesh, Wi-Fi, and/or various proprietary network implementations built on top of the IEEE 802.15.4, 802.15.1 or 802.11* standards.

However, before such a connected system can be used in practice, the various wireless nodes that constitute the network may need to be configured. For example, in a wireless connected lighting system, the first step after physical installation is the commissioning of the network. This basically puts the different wireless nodes into a network groups, in which the nodes can communicate with each other and if so desired with a wireless gateway. Traditionally this commissioning step is done with dedicated equipment, such as IR remote controls or a wired interface from a PC to the gateway/network controller. The availability of multi-protocol radio chipsets for wireless networks makes it now possible to also use wireless communication interfaces which may be available in general-purpose smart devices like mobile phones and tablets. Use of Bluetooth Low Energy (BLE) on smartphones to connect to nodes and commission them in a ZigBee network may for example be an option.

Consequently, a list-based commissioning method may be used where the nodes are not selected by e.g. an IR remote control. Namely: upon a scan command from the user, a smartphone may scan for nodes in the vicinity of the smartphone and populate them on its user interface. Then, the user may select the nodes that are to be commissioned, whereby the desired nodes are identified by making them blink over a BLE connection. However, such a list-based commissioning method may still be a tedious effort, which is a clear disadvantage in e.g. a large networked wireless lighting system, because the process to populate nodes in the user interface may take too long, the scanning should be repeated continuously, and/or the established list may provide an inaccurate representation of the nodes due to changes in the position of the user.

SUMMARY OF THE INVENTION

It is an object of the invention to provide an improved mobile device, which at least alleviates the problems and disadvantages mentioned above. Thereto, the invention provides a mobile device for commissioning and/or controlling at least one node comprising: a motion sensor configured to determine a motion of the mobile device; a radiofrequency transceiver configured to receive an advertisement of at least one node; a controller configured to receive the motion of the mobile device; a user interface, wherein the user interface is a touchscreen display for receiving a user input; wherein the controller is configured to (i) obtain and parse the advertisement of the at least one node, when the mobile device is in a first motion, and (ii) display a list comprising the parsed advertisement of the at least one node on the user interface, when the mobile device is in a second motion; wherein the first motion is the mobile device moving along a path, wherein the second motion is the mobile device not moving away from a location on said path; wherein the user input comprises selecting a node of the at least one node from said list, wherein the controller is configured to control the radiofrequency transceiver to send a control command to said node in response to said user input of selecting said node.

Said mobile device may be suitable for commissioning and/or controlling the at least one node. Commissioning the at least one node may for example start with the mobile device receiving an advertisement of the at least one node with said radiofrequency transceiver, and obtaining and parsing said advertisement of the at least one node with said controller. Displaying the list comprising the parsed advertisement of the at least one node on the user interface may however take an undesired long period of time (e.g. several seconds) in which a user of the mobile device has to wait. This may have a negative influence on the user experience. Such a negative influence on the user experience may even be worse given that a user may have to perform the steps of such a commissioning procedure multiple times for a large networked wireless lighting system.

The mobile device according to the present invention improves such commissioning and/or controlling. Namely: The mobile device comprises a motion sensor for determining a motion of the mobile device. The controller is configured to obtain said motion. Since the controller obtains and parses the advertisement of the at least one node, when the mobile device is in a first motion, which first motion is the mobile device moving along a path, the controller may continuously obtain and parse the advertisement of the at least one node in a background while the mobile device (hence the user) is in motion. When the mobile device is in a second motion, which second motion is the mobile device not moving away from a location on said path, e.g. when standing still to perform the commissioning, a list comprising the obtained and parsed advertisement of the at least one node may be displayed immediately on the user interface. Since displaying said list merely requires a change of the displayed user interface, because the advertisement of the at least one node has already been parsed when the mobile device was in the first motion, unnecessary periods of time waiting for the list to be 'populated' is avoided.

Consequently, an accurate list of the advertisement of the at least one node may be displayed (or: provided) instantaneously on the user interface. Therefore, the present invention advantageously improves the commissioning of at least one node and the ergonomics of displaying such a list.

Commissioning may also include controlling of the at least one node. Hence, the term commissioning may mutatis mutandis be controlling. For example, in a home network of lighting nodes, the mobile device according to the invention may be suitable for controlling said at least one node as discussed throughout.

Proximity of the at least one node may be derived from a RSSI value of the received advertisement. Hence, in an embodiment, the advertisement of the at least one node may comprise an identity of the at least one node. In addition, or optionally, in an embodiment, the controller may be configured to determine, from the advertisement of the at least one node, a RSSI value indicative of the distance between the at least one node and the mobile device. Various algorithms exist to optimize the proximity calculation based on RSSI. For example, in an embodiment, said RSSI value of the at least one node may be a time-averaged RSSI value of the at least one node. Such an averaging may be advantageous, since the RSSI value of the received advertisement may have some variation as a function of time. Moreover, time-averaging may remove, to a certain extent, the effect of multi-path interference on the detected RSSI.

Said displaying of a list comprising the parsed advertisement of the at least one node on the user interface may also be phrased as displaying a list comprising an entry indicative of the parsed advertisement of the at least one node on the user interface. To facilitate commissioning, said advertisement of the at least one node may also comprise data indicative of commissioning properties, such as commissioning data. Hence, in an embodiment, the advertisement of the at least one node may comprise a commissioning status the at least one node. The commissioning status may indicate which node of the at least one node is (e.g. already) commissioned, belongs to which group, has which installation properties, etc.

Moreover, knowing either the RSSI value of the at least one node, and/or the commissioning status of the at least one node, and/or the identity of the at least one node, allows for intuitively listing the parsed information in said list. Hence, in an embodiment, said list may be hierarchically ordered by RSSI value of the at least one node. Further, in an embodiment, said list may be hierarchically ordered by commissioning status of the at least one node.

Furthermore, in an embodiment, the controller may be configured to obtain and parse the advertisement of the at least one node, when the mobile device is moving along said path for at least a predetermined period of time. For example, in an embodiment, the predetermined period of time is one of: at least two seconds, at least four seconds, at least ten seconds, or between two and twelve seconds. As a result, the time duration of the movement may improve confirming the motion of the mobile device, which is a relevant condition for obtaining and parsing the advertisement of the at least one node.

In an embodiment, the controller may be configured to run a first application and to display an output of said first application on the user interface, when the device is in the first motion. For example, the first application may comprise a first function related to the group of mapping, positioning and navigation. Such a first application may be advantageous and ergonomic during movement of the mobile device.

In an embodiment, the motion sensor may be one of: a gyroscope, accelerometer, or a camera. These are economical sensing means for motion, particularly for a mobile device. Further, in an embodiment, the at least one node may be a lighting device. Further, in an embodiment, the at least one node may be a sensor and/or actuator. This is advantageous, as the present invention may be particularly suitable for use in a lighting network, such as an indoor and/or outdoor lighting network, e.g. for commissioning such lighting networks. In an embodiment, the radiofrequency transceiver may be arranged to communicate via ZigBee, Wi-Fi, Lo-Ra, narrow-band TOT, LTR, and/or Bluetooth.

As partly mentioned before: Said mobile device may be suitable for commissioning and/or controlling the at least one node. The user interface may be a touchscreen display for receiving a user input. The user input may be indicative of a commissioning step in respect to the at least one node. For example, as mentioned, the user input may comprise selecting a node of the at least one node from said list, wherein the controller may be configured to control the radiofrequency transceiver to send a control command to said node in response to said user input of selecting said node. For example, in an embodiment, the user input comprises assigning a node of the at least one node from said list to a group. For example, in an embodiment, the user input may comprise selecting a node of the at least one node from said list, wherein the controller may be configured to control the radiofrequency transceiver to send a control command to said node in response to said user input of selecting said node. For example, the control command may be arranged for controlling said node of the at least one node to emit a visual cue. In examples, said visual cue may be one of: Blinking, change of color, change of color temperature, providing a pattern, etc.

It is a further object of the invention to provide an improved system, which at least alleviates the problems and disadvantages mentioned above. Thereto, the invention further provides system comprising the mobile device according to any one of the preceding claims and at least one node. Thereby, advantages and/or embodiments applying to the controller according to the invention may mutatis mutandis apply to said system according to the invention. For example, said node may be a lighting device, and/or a sensor node, and/or an actuator.

In an aspect of the invention, the invention provides: a mobile device comprising: a motion sensor configured to determine a motion of the mobile device; a radiofrequency transceiver configured to receive an advertisement of at least one node; a controller configured to receive the motion of the mobile device; a user interface; wherein the controller is configured to (i) obtain and parse the advertisement of the at least one node, when the mobile device is in a first motion, and (ii) establish a list comprising an entry indicative of the parsed advertisement of the at least one node, (iii) display the list on the user interface, when the mobile device is in a second motion; wherein the first motion is the mobile device moving along a path, wherein the second motion is the mobile device not moving away from a location on said path.

In examples, the controller may be configured to display the parsed advertisement of only a first node of the at least one node on the user interface, when the mobile device is in a second motion. In an embodiment, said first node may comprise a highest RSSI value amongst the nodes of the at least one node. In an embodiment, the at least one node may be a plurality of nodes, wherein the user interface may be a touchscreen display for receiving a user input, wherein the controller may be configured to receive said user input and may be configured to display a second node of the at least one node on the user interface, said second may comprise a RSSI value lower than said first node of the at least one node. Such embodiments allow the list to be a hidden list which is continuously updated and used to display the node with the highest RSSI value and upon receiving a user input (such as toggling or a next-button) display a next node with e.g. a lower RSSI value. Such a toggling user interface may for example more user friendly and more ergonomic, as the list may be populated in the background and commissioning based on blink trials may be performed with the closest node displayed in the user interface.

Hence, in aspects, the invention provides: a mobile device comprising: a motion sensor configured to determine a motion of the mobile device; a radiofrequency transceiver configured to receive an advertisement of a plurality of nodes; a controller configured to receive the motion of the mobile device; a user interface; wherein the controller is configured to (i) obtain and parse the advertisement of the plurality of nodes, when the mobile device is in a first motion, and (ii) establish a list comprising the parsed advertisement of the plurality of nodes, and (iii) display a first node of the list on the user interface, when the mobile device is in a second motion; wherein the first motion is the mobile device moving along a path, wherein the second motion is the mobile device not moving away from a location on said path. The above-mentioned embodiments may additionally apply mutatis mutandis.

It is a further object of the invention to provide an improved method, which at least alleviates the problems and disadvantages mentioned above. Thereto, the invention further provides a method of displaying a list suitable for commissioning at least one node with the mobile device according to the invention, the method comprising: determining a motion of the mobile device; receiving an advertisement of the at least one node; obtaining and parsing the advertisement of the at least one node, when the mobile device is in a first motion, and displaying a list comprising the parsed advertisement of the at least one node on the user interface, when the mobile device is in a second motion; wherein the first motion is the mobile device moving along a path, wherein the second motion is the mobile device not moving away from a location on said path; receiving a user input comprising selecting a node of the at least one node from said list; sending a control command to said node in response to said user input of selecting said node. Thereby, advantages and/or embodiments applying to the controller and/or system according to the invention may mutatis mutandis apply to said method according to the invention.

As partly mentioned before, the method further comprising: receiving a user input comprising selecting a node of the at least one node from said list; sending a control command to said node in response to said user input of selecting said node. Moreover, the control command may be arranged for controlling said node of the at least one node to emit a visual cue. The method may further comprise: assigning said node of the at least one node to a group.

The invention further relates to a computer program product. Hence, the invention provides a computer program product for a computing device, the computer program product comprising computer program code to perform a method of the invention when the computer program product is run on a processing unit of the computing device.

Thus, aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

BRIEF DESCRIPTION OF THE DRAWINGS

The invention will now be further elucidated by means of the schematic non-limiting drawings.

DETAILED DESCRIPTION OF THE EMBODIMENTS

As mentioned, a list-based commissioning method (by a user with a device with a user interface) may be a tedious effort, e.g. in commissioning large networked wireless lighting system, because the process to populate nodes in said user interface may take too long, the scanning has to be repeated continuously, and/or the established list may provide an inaccurate representation of the nodes due to changes in the position of the user. Thereto, this application provides a mobile device, a system and a method according to the invention to overcome such drawbacks.

Figure 1:
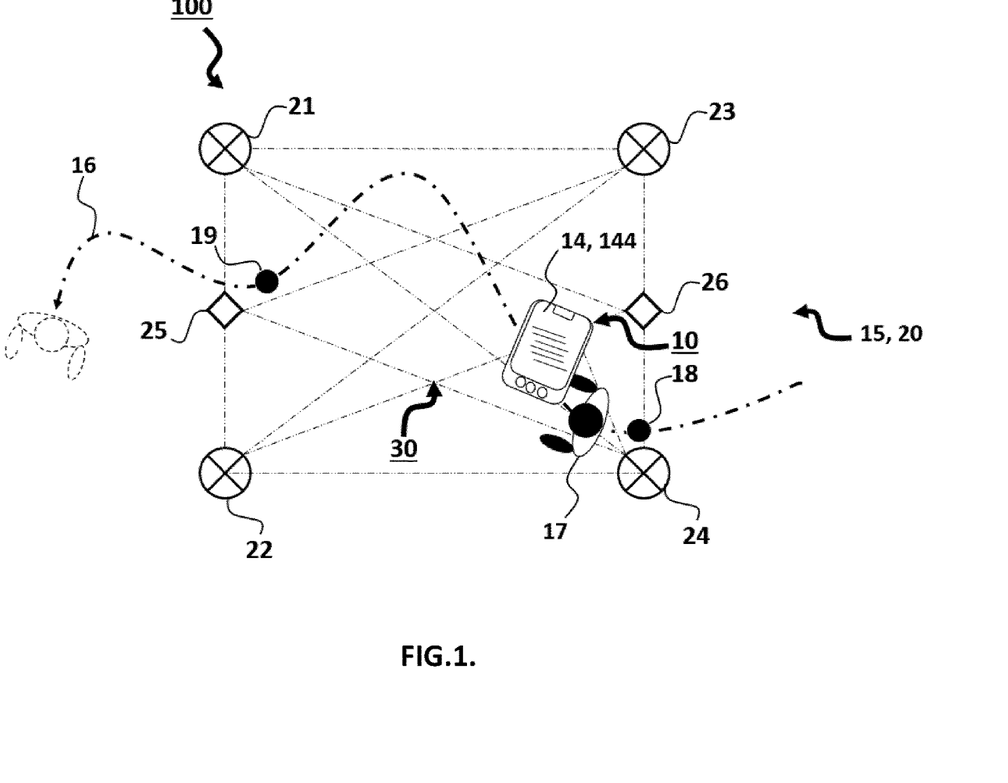
FIG. 1 depicts schematically an embodiment of a mobile device and system according to the invention.
Figure 2:
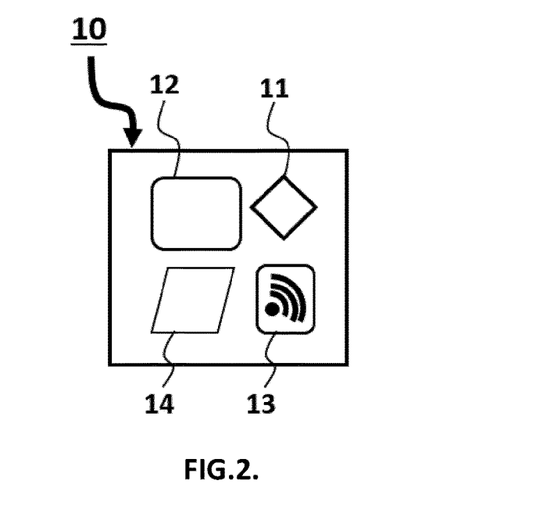
FIG. 2 depicts schematically details of the mobile device of the embodiment depicted in FIG. 1.

FIG. 1 depicts schematically, by non-limiting example, a system 100 comprising a mobile device 10 according to the invention and a plurality of nodes 20. FIG. 2 depicts schematically, by non-limiting example, details of the mobile device 10.

The plurality of nodes 20 are located within an area 15. The plurality of nodes 20 comprises a first set of lighting devices 21, 22 respectively consisting of a right luminaire 21 and a left luminaire 22; a second set of lighting devices 23, 24 respectively consisting of a right luminaire 23 and a left luminaire 24; a first sensor device 25; and a second sensor device 26. All of said devices 21, 22, 23, 24, 25, 26 are smart devices and have wireless connectivity. Here, the sensor devices 25, 26 are microphones, but may alternatively be any other sensor such as e.g. motion sensor, light sensor, PIR sensor, camera sensor, tactile sensor, etc. Said lighting devices 21, 22, 23, 24, and said sensor devices 25, 26 (that is: the plurality of nodes 20) form a wireless network 30. The wireless network 30 is a ZigBee network, but may alternatively be any other wireless modality. Here, the wireless network 30 requires commissioning the first set of lighting devices 21, 22 and the left luminaire 24 of the second set of lighting devices 23, 24 to the first sensor device 25, thereby forming a first group; and only the right luminaire 23 of the second set of lighting devices 23, 24 to the second sensor device 26, thereby forming a second group. Consequently, the lighting devices 21, 22, 23, 24 and/or the sensor devices 25, 26 send out a wireless beacon and/or an advertisement (message).

Said mobile device 10 is suitable for commissioning said devices 21, 22, 23, 24, 25, 26 (i.e. the plurality of nodes 20) by means of receiving an advertisement of said plurality of nodes 20. Namely: A commissioning engineer 17, using and/or holding said mobile device 10, walks around in said area 15 along a path 16 and commissions each respective node of the plurality of nodes 20 (i.e. each of said respective devices) based on the beaconed advertisement message thereof. Thereby, the commissioning engineer 17 may stand still when commissioning the respective nearby nodes of the plurality of nodes 20 (i.e. said devices). In the present embodiment, only a limited number of nodes (i.e. six) is depicted for convenience, but in further examples said plurality of nodes may represent a large-scale network, e.g. with at least twenty or at least forty lighting devices and/or sensor devices.

Referring to FIG. 2 as well, as partly mentioned, the mobile device 10 is arranged to receive such an advertisement (message). The mobile device 10 comprises a motion sensor 11, a controller 12, a radiofrequency transceiver 13 and a user interface 14. The user interface 14 is a touchscreen display, which is configured to receive a user input, e.g. from the commissioning engineer 17.

The motion sensor 11 is an accelerometer, but may alternatively be a gyroscope or a camera. Thereby, the motion sensor 11 determines the motion of the mobile device 10 and outputs this motion to the controller 12. For example, the motion of the mobile device 10 moving along the path 16 can be determined; it may further be detected whether the mobile device 10 is motionless (e.g. standing still), whether the mobile device 10 is changing orientation (e.g. turning, tilting the mobile device 10), and/or whether the mobile device 10 is not moving away from a location on said path 16. Hereby, said path does not have to be predetermined but may be established simultaneously. The controller 12 is configured to receive the motion of the mobile device 10, as determined by the motion sensor 11.

The radiofrequency transceiver 13 receives an advertisement of the plurality of nodes. The transceiver 13 is a ZigBee transceiver, but may alternatively be e.g. a combo-chip for both ZigBee or Bluetooth. That is: the radiofrequency transceiver 13 receives the respective advertisement of each device within range. Here, at a first location 18 on the path 16 in the area 15, the radiofrequency transceiver 13 receives the respective advertisement of the second set of lighting devices 23, 24 and the second sensor 26; but also receives the respective advertisement of the first set of lighting devices 21, 22 and the first sensor 25, albeit at a lower signal strength due to the larger distance thereto from the first location 18. Here, at the second location 19 on the path 16 in the area 15, the radiofrequency transceiver 13 receives the respective advertisement of the first set of lighting devices 21, 22 and the first sensor 25; but also receives the respective advertisement of the second set of lighting devices 23, 24 and the second sensor 26, albeit at a lower signal strength due to the larger distance thereto from the second location 19. Thus, said range may be determined by the signal strength of the beaconing/advertisement signal, i.e. weak signals may e.g. not be received. Alternatively, said controller may disregard signals below a signal strength threshold.

The controller 12 is configured to obtain each respective advertisement via the radiofrequency transceiver and parse said advertisement. All obtained parsed advertisements are displayed on a list 144 on the user interface 14. Alternatively, or additionally, said advertisements may thereby be displayed as advertisement data indicative of the advertisement, thus not literally taking over the advertisement but having some processing in between to arrive at advertisement data suitable for display on the user interface 14. Displaying a list comprising the parsed advertisement of the plurality of nodes 20 on the user interface 14 (i.e. the touchscreen display 14) may however take an undesired long period of time (e.g. several seconds) in which a user (i.e. the commissioning engineer) of the mobile device 10 has to wait, and/or a previously established list may not be representative due to the movement of the user. This may have a negative influence on the user experience and/or commissioning process. Such a negative influence on the user experience may even be worse given that a user may have to perform the steps of such a commissioning procedure multiple times for a large networked wireless lighting system.

The mobile device 10 according to the present invention therefore improves such commissioning. Namely, the controller 12 is configured to obtain and parse the advertisement of the plurality of nodes 20, when the mobile device 10 is in a first motion. The first motion is the mobile device 10 moving along the path 16. Thus, during the first motion of (the commissioning engineer 17) moving along the path 16, the controller 12 may continuously obtain and parse the advertisement of the plurality of nodes 20 in range in the background. Alternatively, the controller may be configured to parse said advertisement when the mobile device is moving along said path for at least a predetermined period of time, such as e.g. one second or two seconds, or alternatively at least four seconds. Moreover, the controller 12 is also configured to display a list 144 comprising the parsed advertisement of the plurality of nodes 20 on the user interface 14, when the mobile device is in a second motion. The second motion is the mobile device 10 not moving away from a location on said path 16, i.e. the first location 18 and/or the second location 19. Not standing still may for example be standing still to perform the commissioning.

Figure 4:
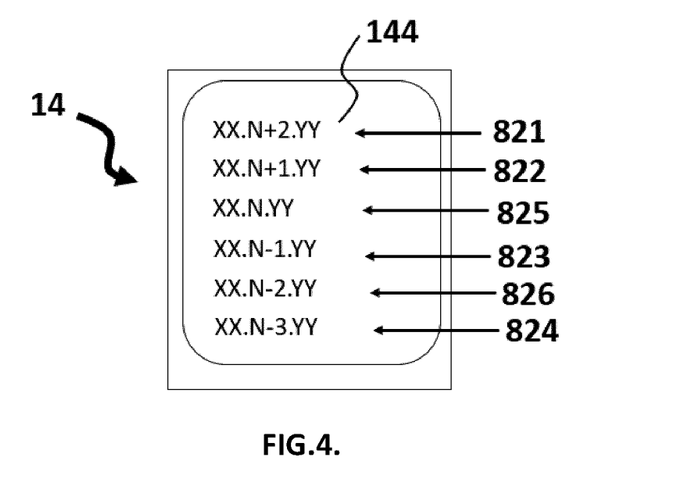
FIG. 4 depicts schematically a first example of a user interface according to the invention in respect to the embodiment depicted in FIG. 1.

Therefore, also referring to FIG. 4 in addition to FIG. 1, the list 144 comprising the obtained and parsed advertisement of the plurality of nodes is displayed immediately on the user interface, when the commissioning engineer 17 is in the second motion (i.e. not moving away) at the first location 18 and/or second location 19. Since displaying said list 144 merely requires a change of the displayed user interface 14, because the advertisement of the plurality of nodes has already been parsed (in the background) when the mobile device 10 was in the first motion (i.e. moving along said path 16), unnecessary periods of time waiting for the list to be 'populated' is avoided and a more representative list is provided for commissioning (e.g. the list order is always reflecting the distance from the current position of the commissioning engineer).

Consequently, an accurate list 144 of the advertisement of the plurality of nodes 20 is displayed (or: provided) instantaneously on the user interface 14. Therefore, the present invention advantageously improves the commissioning of at least one node of the plurality of nodes 20 and the ergonomics of displaying such a list 144.

Still referring to embodiment depicted in FIGS. 1 and 2, but as additional and/or alternative features, the commissioning engineer 17 performs a commissioning step.

Here, also referring to FIG. 4 in addition to FIG. 1, the advertisement of the plurality of nodes 20 comprises their respective identity 821, 822, 823, 824, 825, 826. The list 144 therefore comprises the entries indicative of the parsed advertisement of the nodes on the user interface 14. Moreover, based on the received advertisement of each respective node of the plurality of nodes 20, the controller determines the RSSI value indicative of the distance between the respective node and the mobile device 10. In alternative embodiments, not depicted, the RSSI value of the plurality of nodes may be a time-averaged RSSI value. Moreover, the advertisement of the plurality of nodes 20 comprises a respective commissioning status of the respective node. Here, none of the devices 21, 22, 23, 24, 25, 26 is commissioned yet; hence their respective advertisement comprising a commissioning status of e.g. 'to be commissioned'. This is not explicitly depicted in FIG. 4. As a result, the user interface 14 displays the list 144, wherein the list 144 comprises the identity and the commissioning status of each respective node of the plurality of nodes 20. The list is also hierarchically ordered by RSSI value of the plurality of nodes 20, depending whether the commissioning engineer 17 and the mobile device 10 the commissioning engineer is holding is at the first location 18 or the second location 19.

At the second location 19, the list 144 is populated such that the first set of lighting devices 21, 22 and the first sensor device 25 are on top of the list compared to the second set of lighting devices 23, 24 and the second sensor device 26; because first set of lighting devices 21, 22 and the first sensor device 25 are closer to the second location 19 compared to the second set of lighting devices 23, 24 and the second sensor device 26. This hierarchy is not depicted in the figures.

Furthermore, the commissioning engineer 17, when being at the second location 19, wants to commission the right luminaire 23 of the second set of lighting devices 23, 24 to the second sensor device 26. However, as the right luminaire 23 and the left luminaire 24 of the second set of lighting devices 23, 24 is approximately at a similar further distance away compared to the first set of lighting devices 21, 22 for example, the commissioning engineer 17 cannot clearly judge which advertisement and/or entry on the displayed list 144 is the left luminaire 23 or the right luminaire 24 of the second set of lighting devices 23, 24. Hereby noting that even though the identity may be known, said luminaires may still be switched when installing. Therefore, the commissioning engineer 17 selects with a user input to the touchscreen display 14 either one of the advertisements (i.e. e.g. entries) of the further away luminaires 23, 24 of the second set of lighting devices 21, 22. The selection here is the entry and/or advertisement belonging to the right luminaire 24 of the second set of lighting devices 23, 24. This user input allows the controller to control the radiofrequency transceiver to send a control command to the right luminaire 24 of the second set of lighting device 23, 24 to control this right luminaire 24 to emit a visual cue. Noting the visual cue, the commissioning engineer 27 knows which luminaire is the right luminaire 23 and which luminaire is the left luminaire 24 of the second set of lighting devices 23, 24. Such blink trials may therefore be advantageous in identifying luminaires during commissioning. As the list 144 of the present invention is more accurate and always reflecting the distance from the current position of the commissioning engineer, advantageously less blink trials are required.

Furthermore, the commissioning engineer 17, when being at the second location 19, selects with a user input to the touchscreen display 14 the first set of lighting devices 21, 22, the first sensor device 25 and the left luminaire 24 of the second set of lighting devices 23, 24; and subsequently groups these nodes 21, 22, 25, 24 together in the first group.

Hence, a user input may comprise assigning a node indicated on the list 144 to a group. Similarly, the right luminaire 23 of the second set of lighting devices 23, 24 is grouped with the second sensor device 26. This completes the desired commissioning of the plurality of nodes 20 in terms of grouping devices.

In an embodiment (not depicted), which is partly similar to the embodiment depicted in FIGS. 1 and 2, but now the controller 12 is configured to provide alternative and/or additional features. Namely, the controller 12 is configured to run a first application related to positioning and output said application related to positioning on the user interface 14 when the device is in the first motion, i.e. when the mobile device 10 (hence the commissioning engineer 17) is moving along said path 16. Alternatively, said first application may be related to mapping and/or navigation. Yet alternatively, said first application may be related to communication, for example to allow the commissioning engineer to communicate with other commissioning engineers or a central command center. Since the first application relates to positioning and is run when the mobile device 10 (hence the commissioning engineer) is moving along said path 16, the commissioning engineer 17 may advantageously orient himself/herself within the area 15 from e.g. the first location 18 to the second location 19; whereas when not moving away from such a location 18, 19 the controller displays the list 144 comprising the parsed advertisement of the plurality of nodes 20 on the user interface 14. This facilitates the commissioning process and provides an intuitive user interface switch of functions.

Figure 3:
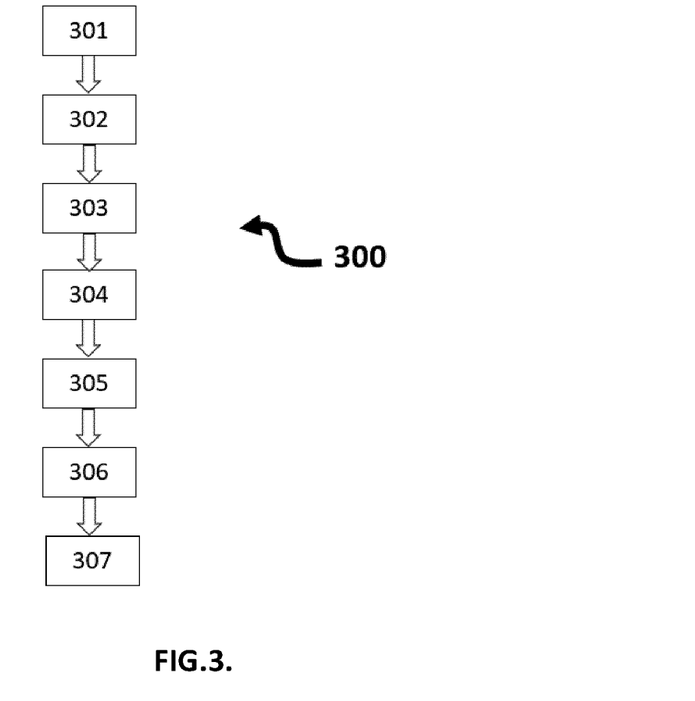
FIG. 3 depicts schematically an embodiment of a method according to the invention.

FIG. 3 depicts schematically, by non-limiting example, a method 300 of displaying a list suitable for commissioning at least one node with the mobile device according to the invention, e.g. the mobile device depicted in FIG. 2. The method comprises the step 301 of determining a motion of the mobile device, the step 302 of receiving an advertisement of the at least one node, and step 303 of obtaining and parsing the advertisement of the at least one node, when the mobile device is in a first motion, the first motion being the mobile device is moving along a path. Similarly, to the embodiment depicted in FIG. 1 and FIG. 2, said determining the motion may be performed by means of an accelerometer, said obtaining and parsing may be performed by means of a radiofrequency transceiver, and said obtaining and parsing of the advertisement by means of a controller of the mobile device. The at least one node may for example be a lighting device and/or a dedicated sensor device or actuator device. Furthermore, the method comprises the step 304 of displaying a list comprising the parsed advertisement of the at least one node on the user interface, when the mobile device is in a second motion, the second motion being the mobile device not moving away from a location on said path. Additionally, in further embodiments, when at said location on said path, the method further comprises step 305 of receiving a user input comprising selecting a node of the at least one node from said list; and step 306 of sending a control command to said node in response to said user input of selecting said node, wherein the control command is arranged for controlling said node of the at least one node to emit a visual cue; and step 307 of assigning said node of the at least one node to a group.

Figure 5:
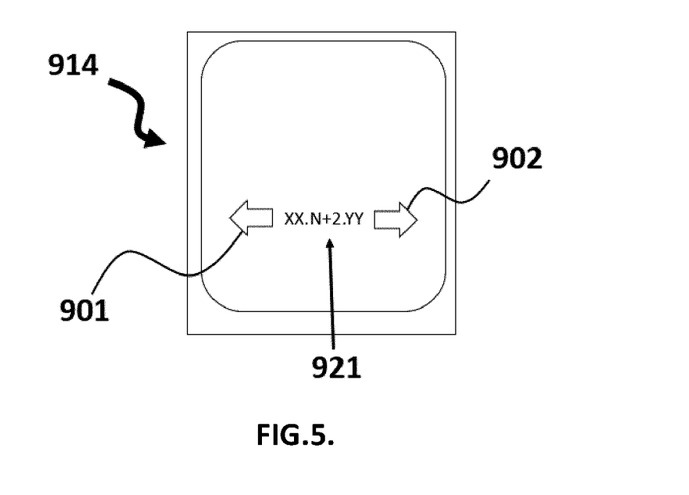
FIG. 5 depicts schematically a second example of a user interface according to the invention.

FIG. 5 depicts schematically, by non-limiting example, a second example of a user interface of an embodiment (not depicted explicitly) according to the invention, which is partly similar to the embodiment depicted in FIG. 1 and FIG. 2, but wherein the controller is configured to display an entry indicative of the parsed advertisement of only a first node 921 of the plurality of nodes on the user interface 914, when the mobile device is in the second motion according to the invention.

Thus, the mobile device according to the invention, e.g. according to the embodiment depicted in FIG. 2, wherein the controller is configured to obtain and parse the advertisement of a plurality of nodes, when the mobile device is in a first motion being moving along a path as indicated above. The controller is further configured to establish said list comprising the parsed advertisement of the plurality of nodes, but only display said first node (of the plurality of nodes) (of said list) on the user interface, when the mobile device is in a second motion being not moving away from a location on said path.

Here, the first node 921 is node with the highest RSSI value. The user interface 914 is a touch screen display. Here, the controller is configured to receive a user input, which is a touch-based selection of a button 902 to either go to the next node in the established list or a touch-based selection of a button 901 to go to the previous node in the established list.

Connected lighting systems may be commissioned via a mobile device according to the present invention. The mobile device according to the invention may instead of a radiofrequency transmitter comprise a dongle which can convert a signal from the mobile device to an IR signal, so as to transmit commands for commissioning and/or configuring nodes of a connected lighting system. Communication between mobile device and such a dongle can be done via Bluetooth or via an audio output of the mobile device, e.g. when the mobile device may be a smartphone comprising such an audio output.

Hence, in further aspects, the present application provides a device for and a method of converting an audio signal at an audio output of a mobile device to an IR signal. Said device may be suitable for commissioning and/or configuring a connected smart system, such as a connected lighting system.

Namely:

The device comprises an audio output and a dongle connected thereto. Both channels of an audio output, i.e. a 'first' channel LEFT and a 'second' channel RIGHT, as commonly known in the art, are used. That is, the first channel is used for a clock signal and the second channel for a data signal. The clock signal will always be present before the data signal is present and can therefore be used for waking up the dongle-circuit. The data signal will be used for creating an IR signal (i.e. e.g. a modulated signal).

The device may be a smartphone. In some examples, the audio output may be inverted. This means that both the clock signal and the data signal will be inverted. An inverted data signal will result in an inverted IR signal, which may not be recognized by a node receiving said IR signal. Therefore, the dongle may be configured to detect its polarity by checking the clock signal and the data signal at any time, i.e.: at normal (correct) polarity, the transitions (High to Low' or low to High') of the data signal will take place at a positive edge of the clock signal; at not normal (inverted) polarity, the transitions of the data signal take place at a negative edge of the clock signal. This method works as long as there is a well-defined phase relation between the clock signal and the data signal, and the pulse period of the clock signal is equal to the smallest 'high' or 'low' interval in the data signal.

Supposing the device being a smartphone: A different way to detect the polarity which only uses the second channel with the data signal is to make use of the fact that in some RC protocols (e.g. the Philips RC6 protocol) the first bit of the data signal is longer than the next one. This means that the length of the first 'high' period that is detected in the dongle depends on the polarity of the signal. For example, in case of a RC6 mode 1A payload, the first 'high' period that the dongle would see is 2.666 microseconds long if the polarity is not inverted, whereas it is 0.888 microseconds long in case the polarity was inverted by the smartphone audio output stage. By measuring the length of the first high bit it is therefore in this case also possible to find out whether the signal polarity was inverted or not. Though in this case the clock signal for detecting the polarity is not needed, it might still be preferential to send it on the other channel in order to use it as a 'wake-up' signal for the dongle in order to save battery power.

Once the dongle has determined that the data signal is inverted, there are several ways to fix the problem: (i) Supposing the node to be commissioned being a lighting node, a visual feedback can be given by e.g. a LED of the lighting node blinking to indicate that the polarity is not correct. Based on this feedback, a commissioning engineer can select a function in the application software on the (smartphone) device to invert the signal. This will lead to an invert of the audio signals which results in a correct IR signal. (ii) The dongle can reconstruct the signal to a correct signal by inverting the incoming data signal and sending out the corresponding IR signal. (iii) Instruct an installed application on the device (e.g. smartphone) to invert the signals. A microcontroller in the dongle may recognize that the signals may not be not aligned in phase and replies with a signal on the microphone input of the audio connector to the e.g. smartphone. The installed app receives this audio feedback and inverts the output signals. As long as the signals are aligned, there will be no feedback on the microphone input of the audio connector, meaning that the installed app can continue. The advantage of this method is that there will be no 'wrong' IR message transmitted, the IR message is terminated right after the first not aligned detection and restarted in the correct phase. The commissioning engineer may not be aware of any smartphone audio output mismatch.

The invention claimed is:

1. A mobile device for commissioning and/or controlling a plurality of nodes comprising:
    a motion sensor configured to determine a motion of the mobile device;
    a radiofrequency transceiver configured to receive a respective advertisement of each of the plurality of nodes within a range;
    a controller configured to receive the motion of the mobile device;
    a user interface, wherein the user interface is a touchscreen display for receiving a user input;
    wherein the controller is configured to (i) obtain and parse the respective advertisement of each of the plurality of nodes, when the mobile device is in a first motion, and (ii) display a list comprising the parsed advertisement of each of the plurality of nodes on the user interface, when the mobile device is in a second motion;
    wherein the first motion is the mobile device moving along a path, wherein the second motion is the mobile device not moving away from a location on said path;
    wherein the user input comprises selecting a node of the plurality of nodes from said list, wherein the controller is configured to control the radiofrequency transceiver to send a control command to said node in response to said user input of selecting said node;
    wherein the controller is configured to determine, from the respective advertisement of each of the plurality of nodes, a respective RSSI value indicative of the distance between a respective one of the at least one node plurality of nodes and the mobile device; and wherein said list is hierarchically ordered by the respective RSSI value of each of the plurality of nodes.

2. The mobile device according to claim 1, wherein the respective advertisement of the plurality of nodes comprises an identity of the plurality of nodes.

3. The mobile device according to claim 1, wherein the respective advertisement of the plurality of nodes comprises a commissioning status the at least one node.

4. The mobile device according to claim 1, wherein the controller is configured to obtain and parse the respective advertisement of the plurality of nodes, when the mobile device is moving along said path for at least a predetermined period of time.

5. The mobile device according to claim 1, wherein the controller is configured to run a first application and to display an output of said first application on the user interface, when the device is in the first motion.

6. The mobile device according to claim 5, wherein the first application comprises a first function related to the group of mapping, positioning and navigation.

7. The mobile device according to claim 1, wherein the user input comprises assigning a node of the plurality of nodes from said list to a group.

8. The system according to claim 1, wherein at least one node of the plurality of nodes is a lighting device.

9. A method of displaying a list suitable for commissioning and/or controlling a plurality of nodes with a mobile device, the method comprising:

determining a motion of the mobile device;

receiving a respective advertisement of each of the plurality of nodes with a range;

obtaining and parsing the respective advertisement of each of the plurality of nodes, when the mobile device is in a first motion, wherein the controller is configured to determine, from the respective advertisement of each of the plurality of nodes, a respective RSSI value indicative of the distance between a respective one of the plurality of nodes and the mobile device, and displaying a list comprising the parsed advertisements of each of the plurality of nodes on the user interface, when the mobile device is in a second motion;

wherein said list is hierarchically ordered by the respective RSSI value of each of the plurality of nodes;

wherein the first motion is the mobile device moving along a path, wherein the second motion is the mobile device not moving away from a location on said path;

receiving a user input comprising selecting a node of the plurality of nodes from said list; and sending a control command to said node in response to said user input of selecting said node.

10. The method according to claim 9, wherein the control command is arranged for controlling said node of the plurality of nodes to emit a visual cue.

11. The method according to claim 9, the method comprising:

assigning said node of the plurality of nodes to a group.

12. A non-transitory computer program product for a computing device, the computer program product comprising computer program code to perform the method of claim 9 when the computer program product is run on a processing unit of the computing device.

* * * * *